United States Patent
Takeuchi et al.

(10) Patent No.: US 6,935,421 B2
(45) Date of Patent: *Aug. 30, 2005

(54) VEHICLE AIR CONDITIONER WITH EJECTOR REFRIGERANT CYCLE

(75) Inventors: Hirotsugu Takeuchi, Nagoya (JP); Shin Nisida, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/422,255

(22) Filed: Apr. 24, 2003

(65) Prior Publication Data

US 2003/0200764 A1 Oct. 30, 2003

(30) Foreign Application Priority Data

Apr. 26, 2002 (JP) .................................... 2002-126403

(51) Int. Cl.$^7$ .............................. F25B 1/00; F25B 1/06; F25B 29/00; B60H 1/00; B60H 3/00
(52) U.S. Cl. ......................... 165/202; 165/42; 165/43; 165/240; 62/238.6; 62/238.7; 62/512; 62/191; 62/90; 62/173; 62/513; 62/500; 237/2 B
(58) Field of Search ......................... 62/513, 191, 500, 62/238.7, 238.6, 173, 90, 512, 434, 435; 165/202, 42, 43, 240, 241, 242; 237/2 B

(56) References Cited

U.S. PATENT DOCUMENTS

| | | | | |
|---|---|---|---|---|
| 5,343,711 A | * | 9/1994 | Kornhauser et al. | 62/500 |
| 5,641,016 A | * | 6/1997 | Isaji et al. | 165/43 |
| 5,983,989 A | * | 11/1999 | Kimishima et al. | 165/43 |
| 6,005,481 A | * | 12/1999 | Takagi et al. | 165/43 |
| 6,042,016 A | * | 3/2000 | Ikeda | 237/2 B |
| 6,047,770 A | * | 4/2000 | Suzuki et al. | 165/42 |
| 6,347,528 B1 | * | 2/2002 | Iritani et al. | 62/434 |
| 6,438,993 B2 | * | 8/2002 | Takeuchi et al. | 62/500 |
| 6,477,857 B2 | * | 11/2002 | Takeuchi et al. | 62/500 |
| 6,604,379 B2 | * | 8/2003 | Hotta et al. | 62/500 |
| 2001/0025499 A1 | * | 10/2001 | Takeuchi et al. | 62/175 |
| 2002/0000095 A1 | * | 1/2002 | Takeuchi et al. | 62/500 |

FOREIGN PATENT DOCUMENTS

| | | |
|---|---|---|
| JP | 5-149652 | 6/1993 |
| JP | 6-206438 | 7/1994 |
| JP | 11-139154 | 5/1999 |

* cited by examiner

*Primary Examiner*—John K. Ford
(74) *Attorney, Agent, or Firm*—Harness, Dickey & Pierce, PLC

(57) ABSTRACT

An air conditioner includes a compressor for compressing refrigerant, an exterior heat exchanger for performing heat exchange between refrigerant and outside air, an interior heat exchanger for performing heat exchange between the refrigerant and air to be blown into the compartment, an ejector for decompressing high-pressure refrigerant, a heater core for heating air using a high-temperature fluid as a heating source, and a fluid-refrigerant heat exchanger that heats the fluid flowing to the heater core using high-temperature refrigerant discharged from the compressor as a heating source. In a dehumidifying and heating operation, refrigerant in the interior heat exchanger absorbs heat from air so that the air is cooled and dehumidified, and the dehumidified and cooled air can be further heated in the heater core by indirectly using the heating source from the high-temperature refrigerant.

8 Claims, 12 Drawing Sheets

HEATING

VEHICLE AIR CONDITIONER WITH EJECTOR REFRIGERANT CYCLE

CROSS REFERENCE TO RELATED APPLICATION

This application is based on Japanese Patent Application No. 2002-126403 filed on Apr. 26, 2002, the disclosure of which is incorporated herein by reference.

BACKGROUND OF THE INVENTION

1. Field of the Invention:

The present invention relates to an air conditioner with an ejector refrigerant cycle. The air conditioner is suitably used for a vehicle.

2. Related Art:

A vehicle air conditioner in a prior art switches a cooling operation and a heating operation, by switching an operation for flowing high-pressure refrigerant in an interior heat exchanger and an operation for flowing low-pressure refrigerant in the interior heat exchanger.

However, in this vehicle air conditioner, when the cooling operation is performed for dehumidifying a passenger compartment, condensed water is generated on a surface of the interior heat exchanger. After that, when the heating operation is performed, the condensed water remained on the surface of the interior heat exchanger evaporates immediately. Therefore, a windshield of an automotive vehicle is readily fogged.

SUMMARY OF THE INVENTION

In view of the above-mentioned problem, it is an object of the present invention to provide an air conditioner for a compartment, which improves heating performance of a compartment. It is another object of the present invention to provide a vehicle air conditioner with a refrigerant cycle, which removes fog immediately even if a windshield of the vehicle is fogged.

According to the present invention, in an air conditioner for a compartment, a refrigerant cycle includes a compressor for compressing and discharging refrigerant, an exterior heat exchanger for performing heat exchange between refrigerant and outside air outside the compartment, an interior heat exchanger for performing heat exchange between refrigerant and air to be blown into the compartment, an ejector for decompressing refrigerant discharged from the compressor while sucking gas refrigerant from a low-pressure side in the refrigerant cycle, a heater core disposed for heating air to be blown into the compartment by using a fluid flowing therein as a heating source, and a fluid-refrigerant heat exchanger disposed to perform heat exchange between refrigerant discharged from the compressor and the fluid to be supplied to the heater core. Further, when refrigerant is evaporated in the interior heat exchanger to cool air passing through the interior heat exchanger, refrigerant is decompressed in the ejector. Because the fluid-refrigerant heat exchanger is disposed to heat the fluid flowing to the heater core, heating performance for heating air in the heater core can be effectively improved. Accordingly, it is possible to immediately heat air in the heater core after being cooled and dehumidified in the interior heat exchanger. In this case, the dehumidifying and heating performance of the compartment can be improved. When the air conditioner is used for a vehicle, a windshield can be rapidly defogged even when the windshield is fogged.

Specifically, a switching unit for changing a refrigerant flow is disposed to switch one of at least a first operation where refrigerant is evaporated in the interior heat exchanger while high-temperature refrigerant discharged from the compressor bypasses the fluid-refrigerant heat exchanger, and a second operation where refrigerant is evaporated in the interior heat exchanger while the refrigerant discharged from the compressor flows through the fluid-refrigerant heat exchanger to heat the fluid. In each of the first operation and the second operation, the ejector decompresses refrigerant discharged from the compressor while sucking gas refrigerant evaporated in the interior heat exchanger. Further, in the second operation, refrigerant discharged from the compressor circulates the fluid-refrigerant heat exchanger, the exterior heat exchanger, the ejector, the gas-liquid separator and the compressor in this order, while refrigerant in the gas-liquid separator flows through the interior heat exchanger, the ejector and the gas-liquid separator in this order. Therefore, in the second operation, air is cooled and dehumidified in the interior heat exchanger, and is rapidly heated in the heater core.

When the first and second throttles are further disposed in the refrigerant cycle for decompressing refrigerant in substantially iso-enthalpy, the switching unit is disposed to switch one of a cooling operation where the compartment is cooled, a dehumidifying and heating operation where the compartment is dehumidified while being heated, and a heating operation where the compartment is heated. In this case, in the cooling operation, refrigerant after being decompressed is evaporated in the interior heat exchanger to cool air passing therethrough, and high-pressure refrigerant discharged from the compressor is decompressed in the ejector while sucking gas refrigerant from the interior heat exchanger. In the dehumidifying and heating operation, refrigerant after being decompressed is evaporated in the interior heat exchanger to cool and dehumidify air passing therethrough, and high-pressure refrigerant discharged from the compressor is decompressed by the first throttle. Further, in the heating operation, high-temperature refrigerant before being decompressed flows into the interior heat exchanger to heat air passing therethrough, and the high-pressure refrigerant is decompressed in the second throttle. Accordingly, the compartment can be effectively cooled, heated or dehumidified while being heated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Preferred embodiments of the present invention will be described hereinafter with reference to the accompanying drawings.

(First Embodiment)

Figure 1:
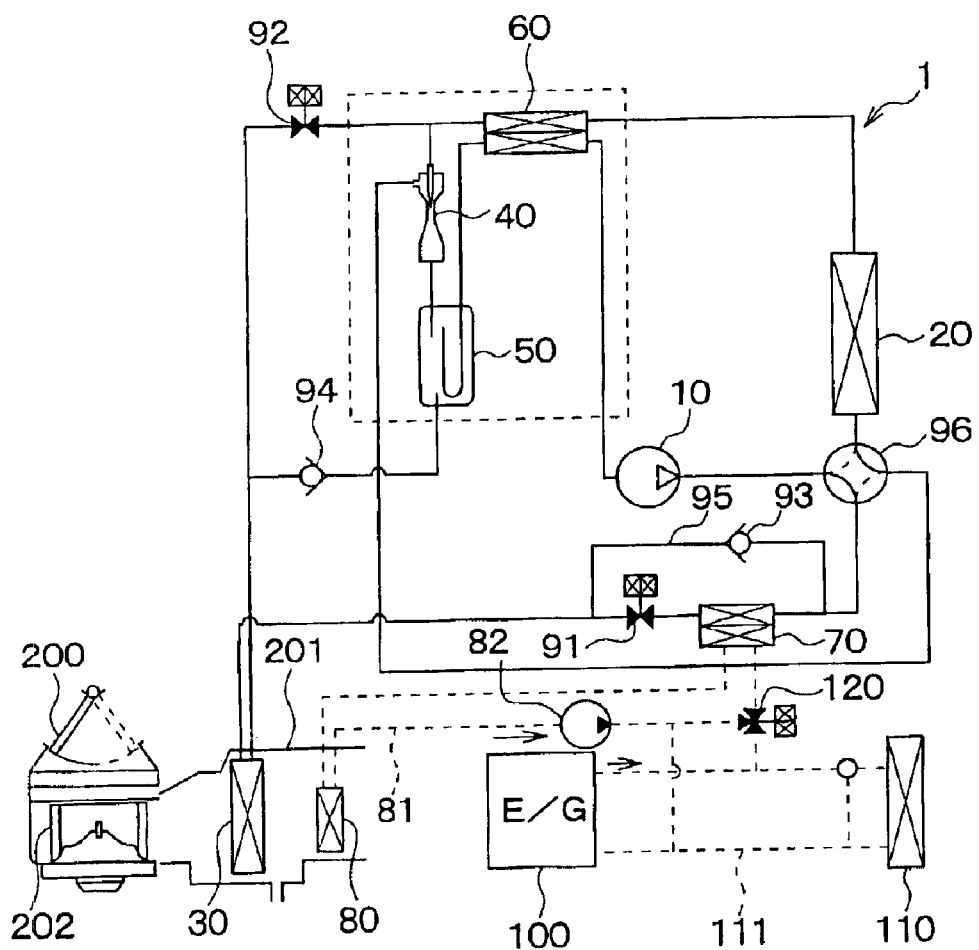
FIG. 1 is a schematic diagram showing an air conditioner with a refrigerant cycle according to a first embodiment of the present invention.

In the first embodiment, an air conditioner of the present invention is typically used for a vehicle. As shown in FIG. 1, the air conditioner includes a vapor-compression refrigerant cycle 1 having an ejector type decompression device. The refrigerant cycle 1 includes a compressor 10, an exterior heat exchanger 20, an interior heat exchanger 30, an ejector 40, a gas-liquid separator 50, an inner heat exchanger 60, a water-refrigerant heat exchanger 70, and a heater core 80.

The compressor 10 is a variable displacement compressor operated by a driving force from a driving engine, and is used as a pumping means for sucking and compressing refrigerant. The compressor 10 variably controls a displacement so as to absorb a variation of an engine speed and an air conditioning load. Here, the displacement means a theoretical displacement discharged from a discharge port of the compressor 10 by one rotation cycle of a shaft in the compressor 10.

In this embodiment, carbon dioxide is used as the refrigerant, so that pressure of high-pressure refrigerant, i.e., discharge pressure of the compressor 10, is equal to or higher than the critical pressure of the refrigerant. Therefore, the refrigerant is not condensed in a high-pressure side heat exchanger, and has a temperature distribution in the high-pressure side heat exchanger such that the temperature of the refrigerant decreases in accordance with a refrigerant flow from an inlet to an outlet of the high-pressure side heat exchanger.

The exterior heat exchanger 20 performs heat exchange between the refrigerant and outside air outside a passenger compartment. The interior heat exchanger 30 performs heat exchange between the refrigerant and air that passes through the interior heat exchanger 30 and then blows into the compartment. In general, the high-pressure side heat exchanger cools high-pressure and high-temperature refrigerant discharged from the compressor 10. A low-pressure side heat exchanger causes a heat absorption by evaporating low-pressure refrigerant. In the first embodiment, the exterior heat exchanger 20 and the interior heat exchanger 30 can be used as the high-pressure side heat exchanger or the low-pressure side heat exchanger.

The ejector 40 decompresses and expands the refrigerant while sucking evaporated gas refrigerant, and converts expansion energy to pressure energy to increase the pressure of refrigerant to be sucked a suction port of the compressor 10. The ejector 40 includes a nozzle, a mixing unit, and a diffuser. The nozzle converts the pressure energy of the high-pressure refrigerant flowing into the ejector 40 to velocity energy so that the refrigerant is decompressed and expanded. High-speed refrigerant jetted from the nozzle flows into the mixing unit, so that the mixing unit sucks the gas refrigerant evaporated in the low-pressure side heat exchanger, and the high-speed refrigerant from the nozzle and the gas refrigerant from the low-pressure side heat exchanger are mixed in the mixing unit. The diffuser mixes the refrigerant jetted from the nozzle and the sucked refrigerant, and converts the velocity energy to the pressure energy, so that the pressure of the refrigerant increases. The nozzle is a decompression device with a Laval nozzle (See "fluid mechanics" published by University of Tokyo Press). The Laval nozzle decompresses and expands the high-pressure refrigerant in substantially iso-entropy so that the refrigerant jetted from the nozzle is accelerated up to a supersonic velocity.

The gas-liquid separator 50 is a separation means of gas and liquid. The refrigerant flowing from the ejector 40 is introduced into the gas-liquid separator 50. The gas-liquid separator 50 separates the refrigerant to gas refrigerant and liquid refrigerant, and accumulates the refrigerant therein. An outlet of the gas refrigerant in the gas-liquid separator 50 connects to the suction side of the compressor 10, and an outlet of the liquid refrigerant in the gas-liquid separator 50 connects to an inlet side of the low-pressure side heat exchanger.

The inner heat exchanger 60 performs heat exchange between the low-pressure refrigerant to be sucked into the compressor 10 and the high-pressure refrigerant before being decompressed by the decompression unit such as the ejector 40. The water-refrigerant heat exchanger 70 performs heat exchange between the high-temperature refrigerant (in this embodiment, the high temperature refrigerant is about at 100° C.) discharged from the compressor 10 and the warm water (i.e., engine-cooling water) flowing in the heater core 80.

The heater core 80 is disposed downstream from the interior heat exchanger 30 in an air flowing direction. Warm water is circulated through the heater core 80, so that the heater core 80 heats air passing therethrough using the warm water as a heating source.

First and second variable throttles 91, 92 are disposed between the interior heat exchanger 30 and the water-refrigerant heat exchanger 70 and between the interior heat exchanger 30 and the inner heat exchanger 60, respectively. The variable throttles 91, 92 are decompression devices while controlling a communication state of a refrigerant passage. Therefore, the devices 91, 92 switch one of a case where the refrigerant is decompressed in iso-enthalpy and a case where the refrigerant passage is closed.

Check valves 93, 94 permit the refrigerant to flow in one-way. A bypass passage 95 is a refrigerant passage for bypassing the water-refrigerant heat exchanger 70. A switching valve 96 switches one of a case where the refrigerant discharged from the compressor 10 flows to the interior heat exchanger 30 and a case where the refrigerant discharged from the compressor 10 flows to the exterior heat exchanger 20.

A radiator 110 cools the engine-cooling water, i.e., cools an engine 100, by performing heat exchange between the engine-cooling water of the engine 100 and the outside air outside of the compartment. A three-way valve 120 switches one of a case where the engine-cooling water flowing from the engine 100 is introduced into the heater core 80 and a case where a cooling water passage 81 in the heater core 80 and a cooling water passage 111 in the engine 100 are separated from each other. A pump 82 circulates the engine-cooling water in the engine-cooling water passage 81.

An inside/outside switching device 200 switches inside air inside the compartment and the outside air outside the compartment, which are introduced into an air conditioning casing 201. The air conditioning casing 201 for defining an air passage accommodates the interior heat exchanger 30 and the heater core 80. A blower 202 is a centrifugal fan for blowing the air introduced from the inside/outside switching device 200 into the compartment.

Next, characteristic operation, and its effect of the air conditioner in this embodiment will be now described.

1. Cooling Operation

Figure 2:
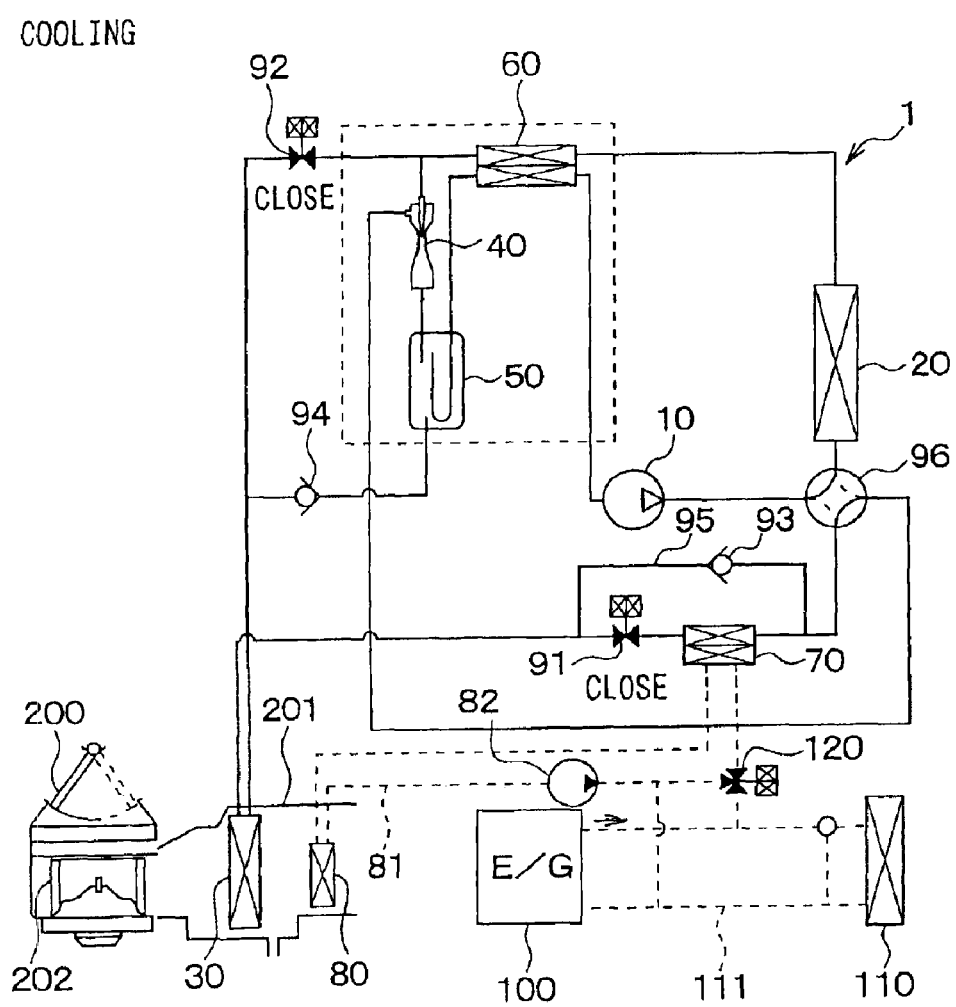
FIG. 2 is a schematic diagram showing the air conditioner in a cooling operation, according to the first embodiment.

The switching valve 96 is set to a position represented by the solid line shown in FIG. 2. The first variable throttle 91 is fully closed, and the second variable valve 92 is fully closed. Then, the compressor 10 is operated.

The refrigerant is discharged from the compressor 10 to be the high-pressure refrigerant, and circulates through the exterior heat exchanger 20, the inner heat exchanger 60, the ejector 40, the gas-liquid separator 50, and the compressor 10, in this order. The heat absorbed in the interior heat exchanger 30 radiates outside the compartment at the exterior heat exchanger 20 so that the refrigerant is cooled in exterior heat exchanger 20.

The ejector 40 sucks the gas refrigerant from the interior heat exchanger 30 by the high-speed refrigerant jetted from the nozzle of the ejector 40. Therefore, the pressure in the interior heat exchanger 30 decreases, and the liquid refrigerant in the interior heat exchanger 30 absorbs heat from the air passing through the interior heat exchanger 30, so that the liquid refrigerant evaporates. The air passing through the interior heat exchanger 30 is cooled by evaporation of the liquid refrigerant in the interior heat exchanger 30, and then blows into the passenger compartment. Here, the low-pressure side refrigerant circulates by pumping operation of the ejector 40 through the gas-liquid separator 50, the interior heat exchanger 30, the bypass passage 95, the ejector 40, and the gas-liquid separator 50, in this order.

Thus, in the cooling operation, low-temperature air cooled in the interior heat exchanger 30 is supplied into the passenger compartment, and the passenger compartment is cooled.

2. Heating Operation

Figure 3:
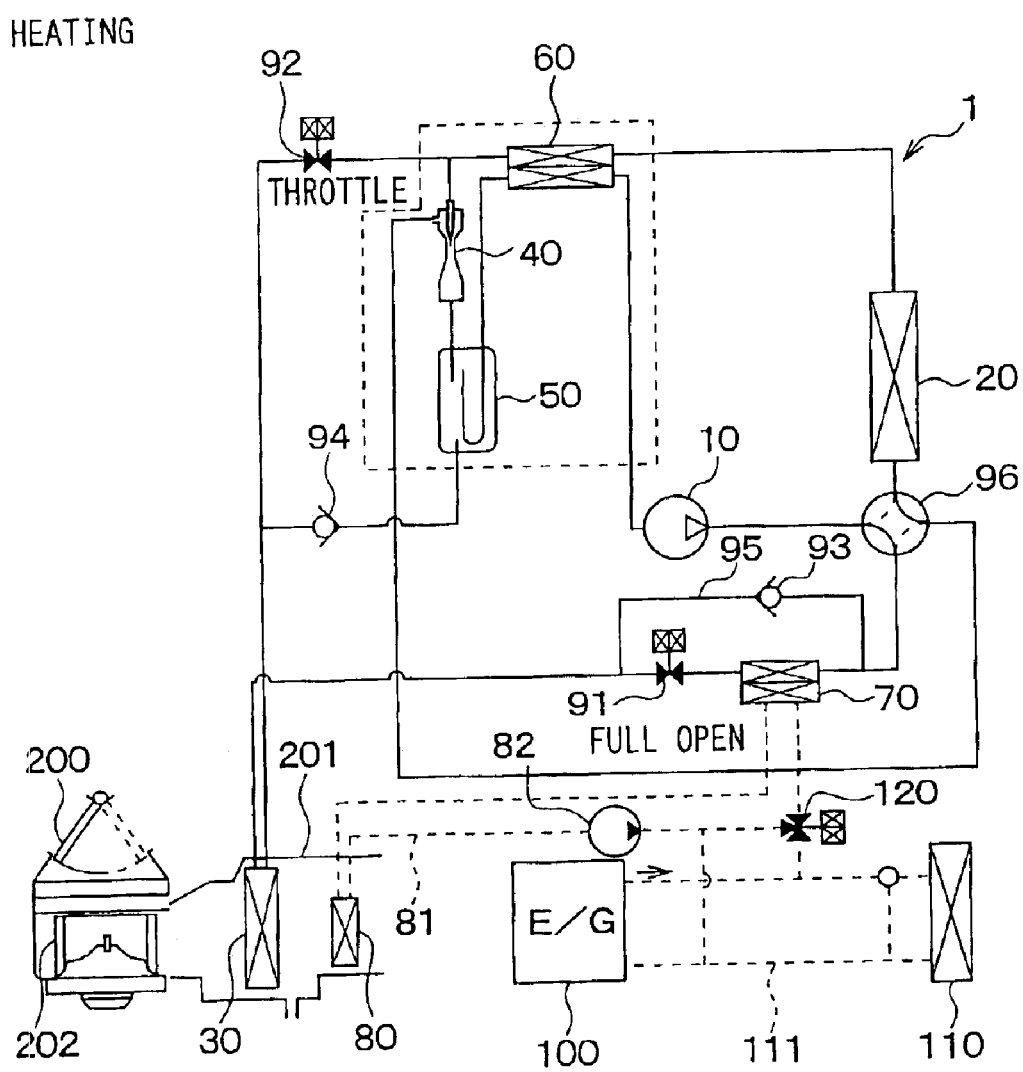
FIG. 3 is a schematic diagram showing the air conditioner in a heating operation, according to the first embodiment.

The switching valve 96 is set to a position represented by the solid line shown in FIG. 3. The first variable throttle 91 is fully opened, and the second variable throttle 92 throttles the opening degree. Then, the compressor 10 is operated.

The refrigerant discharged from the compressor 10 circulates through the water-refrigerant heat exchanger 70, the first variable throttle 91, the interior heat exchanger 30, the second variable throttle 92, the inner heat exchanger 60, the exterior heat exchanger 20, the ejector 40, the gas-liquid separator 50, the inner heat exchanger 60, and the compressor 10, in this order. In the heating operation, the ejector 40 is generally used as a refrigerant passage, and does not works as a decompression device or a pump.

In this case, the first variable throttle 91 is fully opened, so that the high-temperature and high-pressure refrigerant before decompressing flows into the interior heat exchanger 30. Therefore, in the heating operation, the interior heat exchanger 30 is used as the high-pressure side heat exchanger, so that air passing through the interior heat exchanger 30 is heated by this high-temperature and high-pressure refrigerant. The air is heated in the interior heat exchanger 30, and then blows into the compartment.

The high-pressure refrigerant flowing from the interior heat exchanger 30 is decompressed by the second variable throttle 92 in iso-enthalpy, and flows into the exterior heat exchanger 20 through the inner heat exchanger 60. Therefore, the refrigerant flowing in the exterior heat exchanger 20 absorbs heat from the outside air in the exterior heat exchanger 20 so that the refrigerant evaporates in the exterior heat exchanger 20. In the heating operation, the exterior heat exchanger 20 is used as the low-pressure side heat exchanger.

In the heating operation, because the refrigerant has substantially no temperature difference between the inlet side refrigerant and the outlet side refrigerant of the exterior heat exchanger 20, the inner heat exchanger 60 does not exchange heat substantially.

Because pressure loss (flowing resistance) at the nozzle of the ejector 40 is extremely large enough, the refrigerant flowing from the second variable throttle 92 does not flow into the ejector nozzle, virtually. Similarly, the refrigerant flowing from the exterior heat exchanger 20 to the ejector 40 does not flow reversely or does not flow into the second variable throttle 92, virtually.

As a result, high-temperature air heated in the interior heat exchanger 30 is supplied into the passenger compartment in the heating operation.

It is preferred to stop the pump 82 in the heating operation. However, when the engine-cooling water temperature is higher than the refrigerant temperature, the pump 82 can be operated.

3. Dehumidifying and Heating Operation

Figure 4:
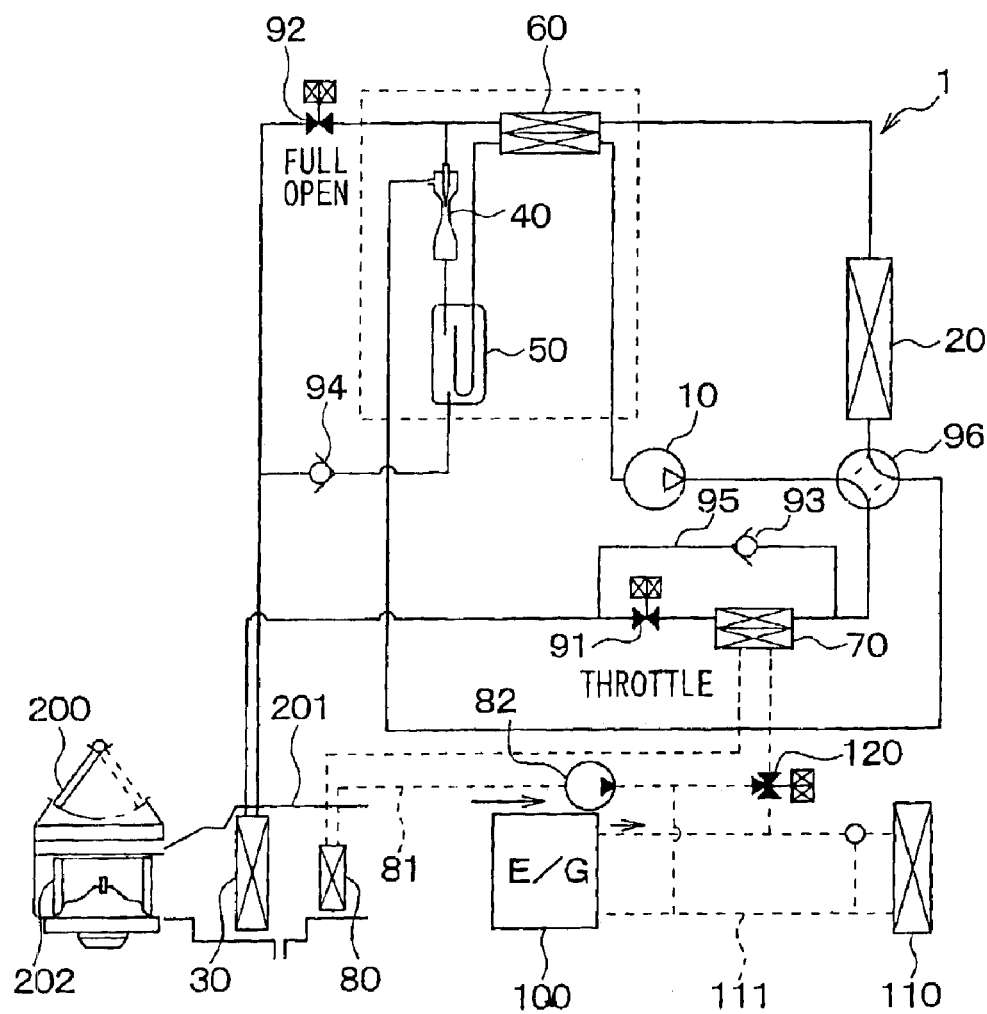
FIG. 4 is a schematic diagram showing the air conditioner in a dehumidifying and heating operation, according to the first embodiment.

The switching valve 96 is set to a position represented by the solid line shown FIG. 4. The first variable throttle 91 throttles the opening degree, and the second variable throttle 92 is fully opened. Then, the pump 82 and the compressor 10 are operated.

The refrigerant discharged from the compressor 10 circulates through the water-refrigerant heat exchanger 70, the first variable throttle 91, the interior heat exchanger 30, the second variable throttle 92, the inner heat exchanger 60, the exterior heat exchanger 20, the ejector 40, the gas-liquid separator 50, the inner heat exchanger 60, and the compressor 10, in this order. In the dehumidifying and heating operation, similarly to the heating operation, the ejector 40 is used generally as a refrigerant passage. Therefore, the ejector 40 does not work as a decompression device or a pump.

The pump 82 is working, so that the high-temperature refrigerant discharged from the compressor 10 heats the engine-cooling water to be circulated through the heater core 80. In other words, in the water-refrigerant heat exchanger 70, the engine-cooling water absorbs heat from the high-temperature refrigerant discharged from the compressor 10, so that the air passing through the heater core 80 is heated. Therefore, the heater core 80 is used as a heater, and the air passing through the heater core 80 is heated by the high-temperature refrigerant as a heating source discharged from the compressor 10. Even when the engine 100 is at a low temperature such as in a case just after starting engine, the engine-cooling water is heated rapidly by the high-temperature refrigerant in the water-refrigerant heat exchanger 70. The heated engine-cooling water flows into the heater core 80, and then heats the air passing through the heater core 80. Thus, the heated air blows into the compartment.

The high-pressure refrigerant flowing from the water-refrigerant heat exchanger 70 is decompressed at the first variable throttle 91 in iso-enthalpy, and then the decompressed refrigerant flows into the interior heat exchanger 30. The refrigerant flowing into the interior heat exchanger 30 absorbs heat from the air passing through the interior heat exchanger 30 so that the refrigerant evaporates in the interior heat exchanger 30. Therefore, the air is cooled by the interior heat exchanger 30 down to the dew point. Thus, moisture contained in the air can be condensed on the interior heat exchanger 30, and the condensed water is discharged to outside of the air conditioner casing 201 from a water discharge port (not shown). Therefore, the moisture in the air is eliminated from the air, so that the air is dehumidified and cooled.

Accordingly, the interior heat exchanger 30 dehumidifies and cools the air passing through the interior heat exchanger 30, and then, the high-temperature water in the heater core 80 heats the air having been dehumidified and cooled in the interior heat exchanger 30. As a result, low-humidity and high-temperature air is supplied into the passenger compartment.

Moreover, the vehicle air conditioner can prevent the window glass such as the windshield of the vehicle from being fogged, and eliminate a fog immediately by blowing the low-humidity and high-temperature air even if the windshield of the vehicle is fogged, because the low-humidity and high-temperature air supplied into the passenger compartment eliminates the fog.

Further, the vehicle air conditioner can heat the compartment immediately by the high-temperature refrigerant discharged from the compressor 10 through the water-refrigerant heat exchanger 70 even when the engine-cooling water for cooling the engine 100 is at a low temperature such as in a case just after starting engine.

(Second Embodiment)

Figure 5:
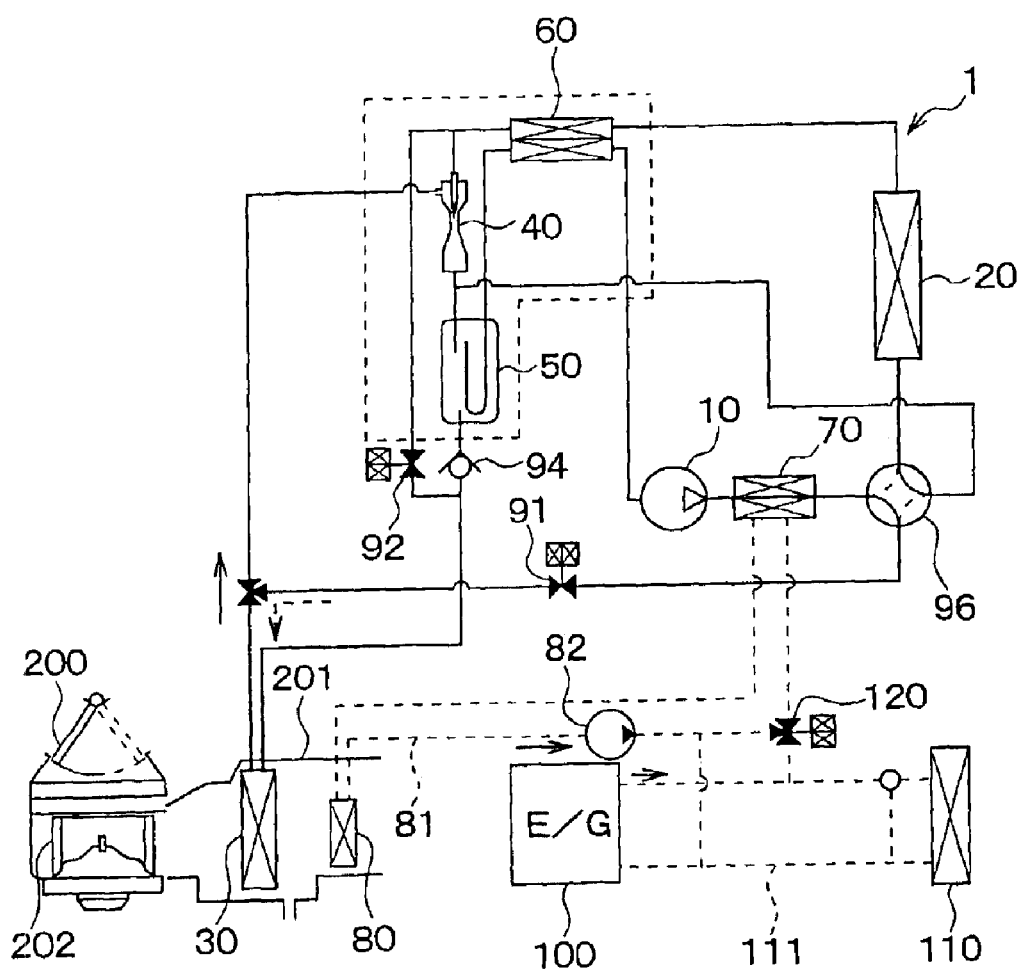
FIG. 5 is a schematic diagram showing an air conditioner with a refrigerant cycle according to a second embodiment of the present invention.

The second embodiment is a modification of the first embodiment. Specifically, as shown in FIG. 5, the water-refrigerant heat exchanger 70 is disposed upstream from the switching valve 96 in the refrigerant flowing direction. In other words, the water-refrigerant heat exchanger 70 is disposed on the discharge side of the compressor 10 rather than the switching valve 96.

Although a refrigerant system of the second embodiment is modified, operation of the refrigerant system of the second embodiment is similar to that of the above-described first embodiment, and the advantage similar to the first embodiment can be obtained.

(Third Embodiment)

Figure 6:
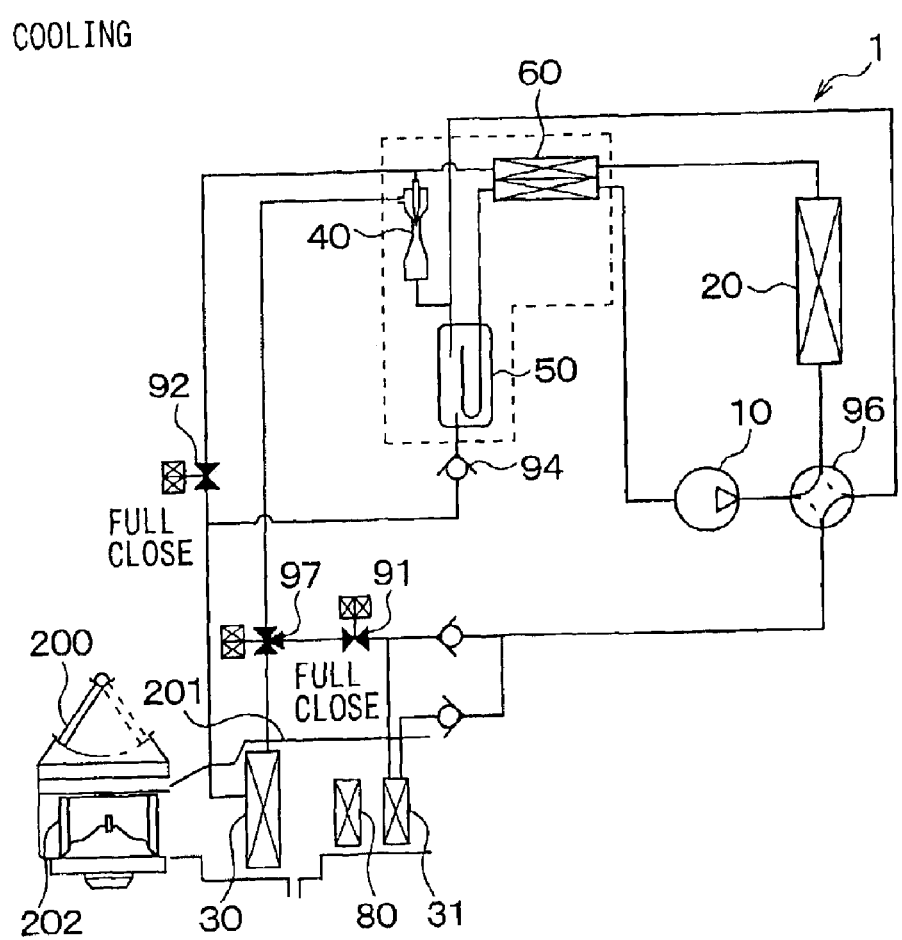
FIG. 6 is a schematic diagram showing an air conditioner with a refrigerant cycle in a cooling operation, according to a third embodiment of the present invention.

In the dehumidifying and heating operation of the above-described first embodiment, the water-refrigerant heat exchanger 70 heats the engine-cooling water circulating through the heater core 80, so that the air to be blown into the compartment is heated indirectly by the high-temperature refrigerant as a heating source discharged from the compressor 10. In the third embodiment, as shown in FIG. 6, the interior heat exchanger 30 is used as a first interior heat exchanger, and a second interior heat exchanger 31 is disposed downstream from the interior heat exchanger 30 in the air flowing direction. The high-temperature refrigerant discharged from the compressor 10 is introduced in the second interior heat exchanger 31 so that the air to be blown into the compartment is heated directly by the second interior heat exchanger 31.

Next, characteristic operation and its effect of the air conditioner in this embodiment will be now described.

1. Cooling Operation

The switching valve 96 is set to a position represented by the solid line shown in FIG. 6. The first variable throttle 91 is fully closed, and the second variable valve 92 is fully closed. Then, the compressor 10 is operated.

The refrigerant discharged from the compressor 10 circulates through the exterior heat exchanger 20, the inner heat exchanger 60, the ejector 40, the gas-liquid separator 50, and the compressor 10, in this order. The heat absorbed in the interior heat exchanger 30 radiates outside the compartment at the exterior heat exchanger 20 so that the refrigerant is cooled in the exterior heat exchanger 20.

The ejector 40 sucks the gas refrigerant from the interior heat exchanger 30 by the high-speed refrigerant jetted from the nozzle of the ejector 40. Then, the pressure in the interior heat exchanger 30 decreases, and the liquid refrigerant in the interior heat exchanger 30 absorbs heat from the air passing through the interior heat exchanger 30, so that the liquid refrigerant evaporates. The air passing through the interior heat exchanger 30 is cooled by the liquid refrigerant in the interior heat exchanger 30, and then blows into the passenger compartment. Here, the low-pressure refrigerant circulates through the gas-liquid separator 50, the interior heat exchanger 30, the three-way valve 97, the ejector 40, and the gas-liquid separator 50, in this order.

Thus, low-temperature air cooled at the interior heat exchanger 30 is supplied into the passenger compartment, and the passenger compartment is cooled.

2. Heating Operation

Figure 7:
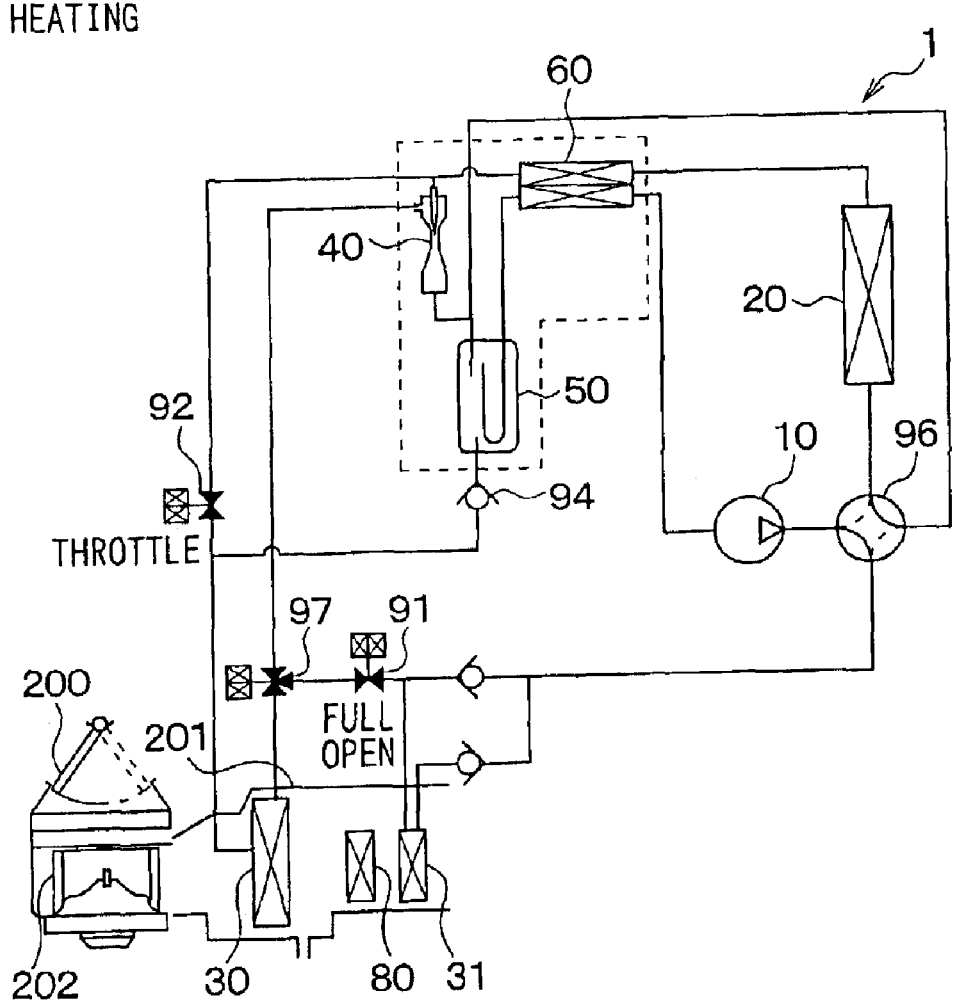
FIG. 7 is a schematic diagram showing the air conditioner in a heating operation, according to the third embodiment.

The switching valve 96 is set to a position represented by the solid line shown in FIG. 7. The first variable throttle 91 is fully opened, and the second variable throttle 92 throttles the opening degree. Then, the compressor 10 is operated.

The refrigerant discharged from the compressor 10 circulates through the second interior heat exchanger 31, the first variable throttle 91, the switching valve 97, the interior heat exchanger 30, the second variable throttle 92, the inner heat exchanger 60, the exterior heat exchanger 20, the gas-liquid separator 50, the inner heat exchanger 60, and the compressor 10, in this order. In the heating operation, the ejector 40 is used generally as a refrigerant passage, and does not work as a decompression device or a pump.

In this case, the high-temperature and high-pressure refrigerant discharged from the compressor 10 is introduced into the second interior heat exchanger 31, so that the air passing through the second interior heat exchanger 31 is heated by the high-temperature refrigerant as a heating source discharged from the compressor 10. Therefore, the second heat exchanger 31 works as a heater.

The temperature of the refrigerant flowing into the interior heat exchanger 30 is slightly decreased because the air passing through the second interior heat exchanger 31 absorbs heat of the refrigerant in the second interior heat exchanger 31. However, the refrigerant flowing into the interior heat exchanger 30 can heat the air sufficiently if the air is at a comparably low temperature such as in a case where the air is before heating at the second heat exchanger 31. In the third embodiment, the air blows into the compartment through the interior heat exchanger 30 and the second interior heat exchanger 31, in this order. Therefore, the interior heat exchanger 30 firstly heats the air up at a certain temperature, and then the second interior heat exchanger 31 heats the air sufficiently. In the heating operation, the air to be blown into the compartment is heated both in the interior heat exchanger 30 and in the second interior heat exchanger 31.

The high-pressure refrigerant flowing from the interior heat exchanger 30 is decompressed by the second variable throttle 92 in iso-enthalpy, and flows into the exterior heat exchanger 20 through the interior heat exchanger 60. Then, the refrigerant flowing in the exterior heat exchanger 20 absorbs heat from the outside air so that the refrigerant evaporates in the exterior heat exchanger 20.

In this case, because the refrigerant has substantially no temperature difference between the inlet side refrigerant and the outlet side refrigerant of the exterior heat exchanger 20, the inner heat exchanger 60 does not exchange heat substantially.

Because pressure loss (flowing resistance) at the nozzle of the ejector 40 is extremely large enough, the refrigerant flowing from the second variable throttle 92 does not flow into the ejector nozzle, virtually. Similarly, the refrigerant flowing from the exterior heat exchanger 20 to the ejector 40 does not flow reversely or does not flow into the second variable throttle 92, virtually.

As a result, high-temperature air heated in the interior heat exchanger 30 and the second interior heat exchanger 31 is supplied into the passenger compartment.

3. Dehumidifying and Heating Operation

Figure 8:
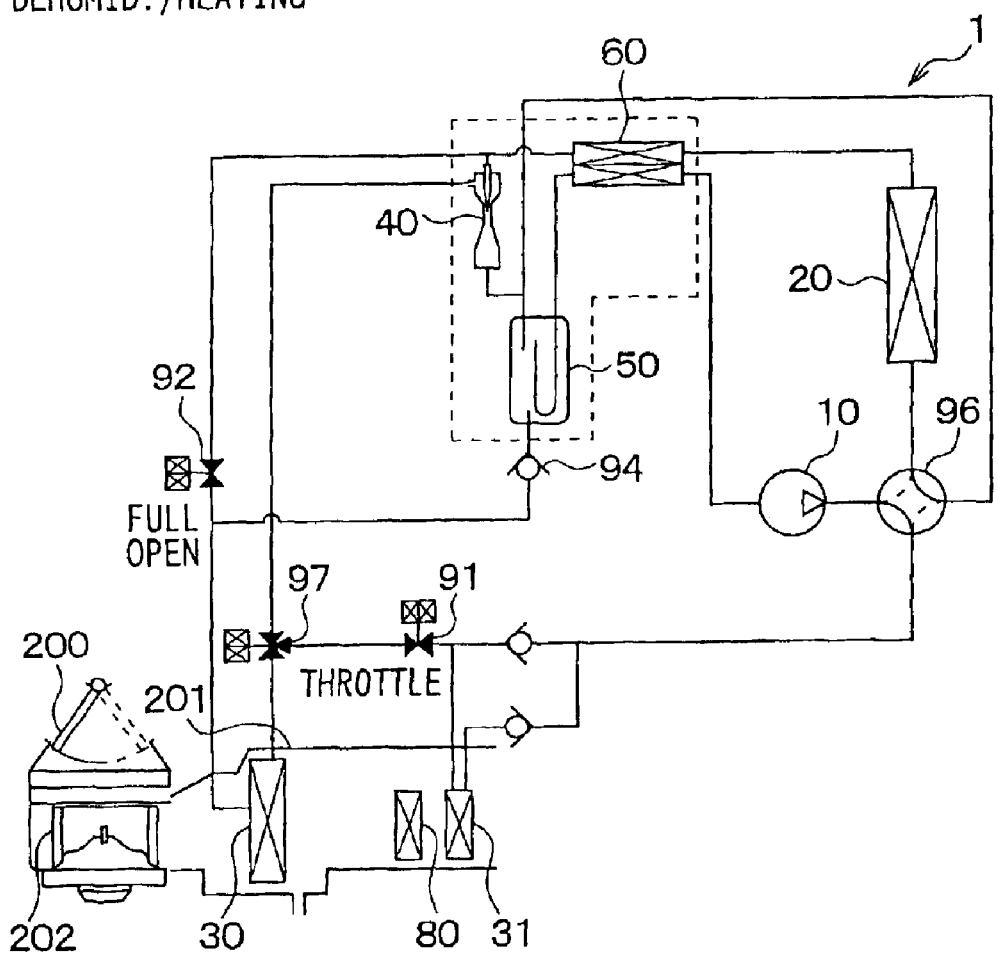
FIG. 8 is a schematic diagram showing the air conditioner in a dehumidifying and heating operation, according to the third embodiment.

The switching valve 96 is set to a position represented by the solid line shown in FIG. 8. The first variable throttle 91 throttles the opening degree, and the second variable throttle 92 is fully opened. Then, the compressor 10 is operated.

The refrigerant discharged from the compressor 10 circulates through the second interior heat exchanger 31, the first variable throttle 91, the switching valve 97, the interior heat exchanger 30, the second variable throttle 92, the inner heat exchanger 60, the exterior heat exchanger 20, the gas-liquid separator 50, the inner heat exchanger 60, and the compressor 10, in this order. In the dehumidifying and heating operation, similar to the heating operation, the ejector 40 is used generally as a refrigerant passage, and does not work as a decompression device or a pump.

The high-temperature refrigerant discharged from the compressor 10 is introduced into the second interior heat exchanger 31, so that the air passing through the second interior heat exchanger 31 is heated by the high-temperature refrigerant in the second interior heat exchanger 31 as a heating source discharged from the compressor 10. Thus, the heated air blows into the compartment.

Then, the refrigerant flows through the first variable throttle 91, and is decompressed at the first variable throttle 91. After that, the decompressed refrigerant flows into the interior heat exchanger 30. The refrigerant flowing into the interior heat exchanger 30 absorbs heat from the air passing through the interior heat exchanger 30 so that the refrigerant evaporates in the interior heat exchanger 30. By absorbing the heat of the air, the air passing through the interior heat exchanger 30 is cooled down to the dew point. Thus, moisture contained in the air can be condensed on the surface of the interior heat exchanger 30, and the condensed water is discharged to outside of the air conditioner casing 201 from a water discharge port (not shown). Therefore, the moisture in the air is eliminated from the air, so that the air is dehumidified and cooled.

Accordingly, the interior heat exchanger 30 dehumidifies and cools the air passing through the interior heat exchanger 30, and then, the high-temperature refrigerant in the second interior heat exchanger 31 heats the air having been dehumidified and cooled in the interior heat exchanger 30. As a result, the low-humidity and high-temperature air is supplied into the passenger compartment.

In this embodiment, the vehicle air conditioner can prevent the window glass such as the windshield of the vehicle from being fogged, and eliminate a fog immediately by blowing the high-temperature air even if the windshield of the vehicle is fogged, because the low-humidity and high-temperature air supplied into the passenger compartment eliminates the fog.

Further, the vehicle air conditioner can heat the compartment immediately by using the high-temperature refrigerant discharged from the compressor 10 even when the engine-cooling water for cooling the engine 100 is at a low temperature such as in a case just after starting engine.

(Fourth Embodiment)

In the fourth embodiment, heating operation with a heat pump refrigerant cycle, i.e., an air heating function due to the interior heat exchanger 30, is eliminated from the vehicle air conditioner in the first embodiment, so that a manufacturing cost of the vehicle air conditioner in the fourth embodiment reduces. However, the heating operation can be performed as follows.

Figure 9:
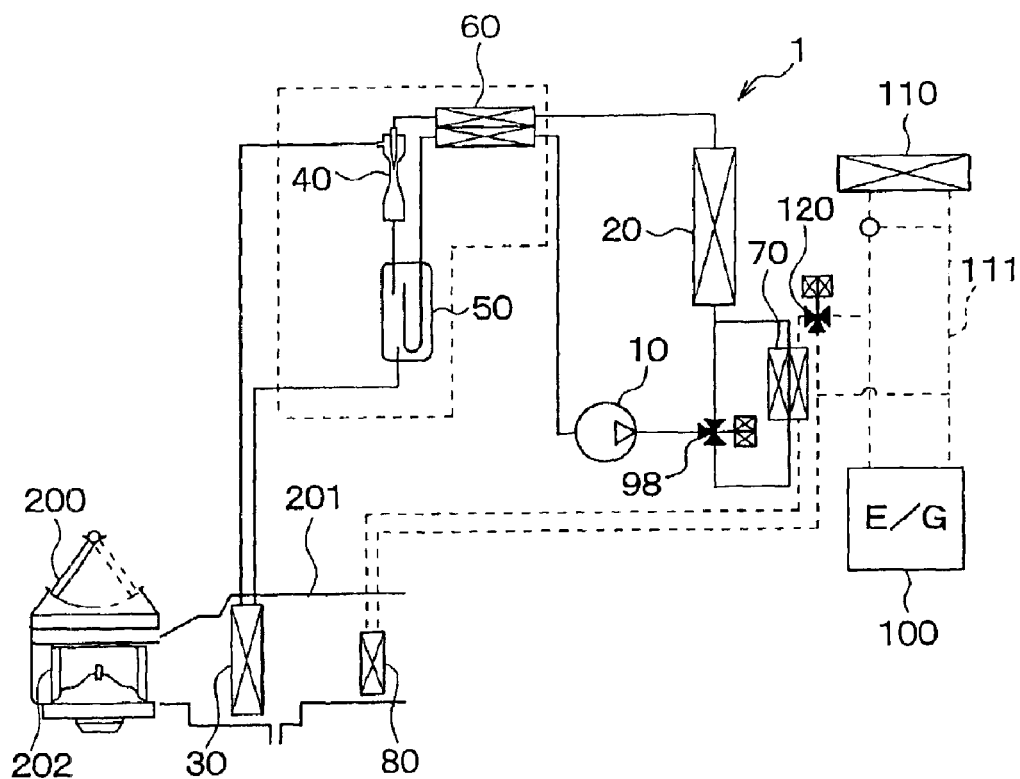
FIG. 9 is a schematic diagram showing an air conditioner with a refrigerant cycle according to a fourth embodiment of the present invention.

Specifically, as shown in FIG. 9, the switching valve 98 is disposed on the discharge side of the compressor 10. The switching valve 98 switches one of a case where the refrigerant discharged from the compressor 10 flows into the water-refrigerant heat exchanger 70 and a case where the refrigerant does not flow into the water-refrigerant heat exchanger 70.

In the cooling operation, the refrigerant discharged from the compressor 10 circulates through the switching valve 98, the exterior heat exchanger 20, the inner heat exchanger 60, the ejector 40, the gas-liquid separator 50, the inner heat exchanger 60, and the compressor 10, in this order. The low-pressure refrigerant circulates through the gas-liquid separator 50, the interior heat exchanger 30, the ejector 40, and the gas-liquid separator 50, in this order.

In the dehumidifying and heating operation, the refrigerant discharged from the compressor 10 circulates through the switching valve 98, the water-refrigerant heat exchanger 70, the exterior heat exchanger 20, the inner heat exchanger 60, the ejector 40, the gas-liquid separator 50, the inner heat exchanger 60, and the compressor 10, in this order. On the other hand, the low-pressure refrigerant circulates the gas-liquid separator 50, the interior heat exchanger 30, the ejector 40, and the gas-liquid separator 50, in this order.

Therefore, in the fourth embodiment, in the dehumidifying and heating operation, the high-pressure refrigerant is decompressed by the ejector 40 while gas refrigerant from the interior heat exchanger 30 is sucked into the ejector 40. Accordingly, in the dehumidifying and heating operation, water flowing into the heater core 80 is sufficiently heated by the heat exchanger 70. Therefore, air cooled and dehumidified in the interior heat exchanger 30 is sufficiently heated by the heater core 80, and the advantage similar to the first embodiment can be obtained.

(Fifth Embodiment)

Figure 10:
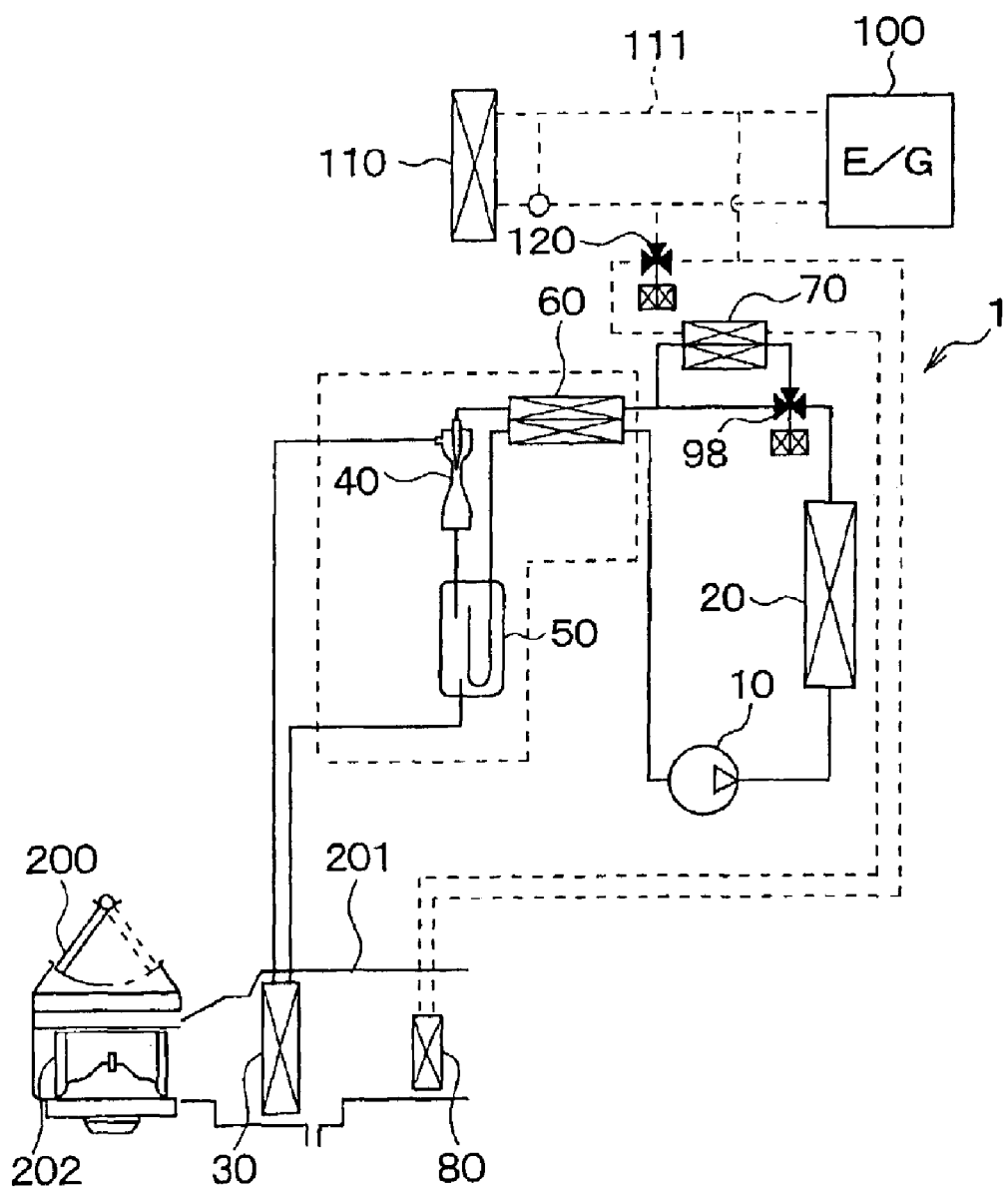
FIG. 10 is a schematic diagram showing an air conditioner with a refrigerant cycle according to a fifth embodiment of the present invention.

This embodiment is a modification of the fourth embodiment. Specifically, the water-refrigerant heat exchanger 70 is disposed downstream from the exterior heat exchanger 20 in a refrigerant flowing direction, as shown in FIG. 10.

In the cooling operation, the refrigerant discharged from the compressor 10 circulates through the exterior heat exchanger 20, the switching valve 98, the inner heat exchanger 60, the ejector 40, the gas-liquid separator 50, the inner heat exchanger 60, and the compressor 10, in this order. The low-pressure refrigerant circulates through the gas-liquid separator 50, the interior heat exchanger 30, the ejector 40, and the gas-liquid separator 50, in this order.

In the dehumidifying and heating operation, the refrigerant discharged from the compressor 10 circulates through the exterior heat exchanger 20, the switching valve 98, the water-refrigerant heat exchanger 70, the inner heat exchanger 60, the ejector 40, the gas-liquid separator 50, the inner heat exchanger 60, and the compressor 10, in this order. The low-pressure refrigerant circulates through the gas-liquid separator 50, the interior heat exchanger 30, the ejector 40, and the gas-liquid separator 50, in this order.

Therefore, in the fifth embodiment, in the dehumidifying and heating operation, the high-pressure refrigerant is decompressed by the ejector 40 while gas refrigerant from the interior heat exchanger 30 is sucked into the ejector 40. Accordingly, the advantage similar to the fourth embodiment can be obtained.

(Sixth Embodiment)

In the sixth embodiment, a heating operation with a heat pump, i.e., an air heating function due to the interior heat exchanger 30, is eliminated from the air conditioner in the third embodiment, so that a manufacturing cost of the vehicle air conditioner in the sixth embodiment reduces. However, the heating operation can be performed as follows.

Figure 11:
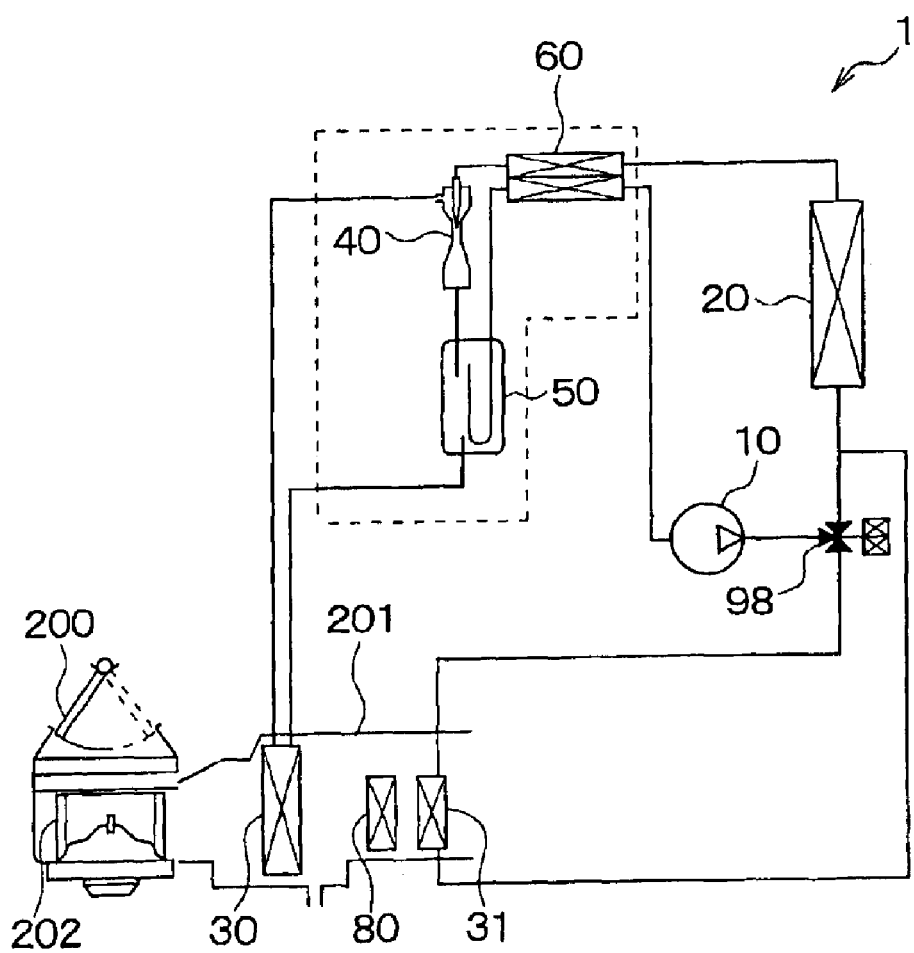
FIG. 11 is a schematic diagram showing an air conditioner with a refrigerant cycle according to a sixth embodiment of the present invention.

Specifically, as shown in FIG. 11, the switching valve 98 is disposed on the discharge side of the compressor 10. The switching valve 98 switches one of a case where the refrigerant discharged from the compressor 10 flows into the second interior heat exchanger 31 and a case where the refrigerant does not flow into the second interior heat exchanger 31.

In the cooling operation, the refrigerant discharged from the compressor 10 circulates through the switching valve 98, the exterior heat exchanger 20, the inner heat exchanger 60, the ejector 40, the gas-liquid separator 50, the inner heat exchanger 60, and the compressor 10, in this order. The low-pressure refrigerant circulates through the gas-liquid separator 50, the interior heat exchanger 30, the ejector 40, and the gas-liquid separator 50, in this order.

In the dehumidifying and heating operation, the refrigerant discharged from the compressor 10 circulates through the second interior heat exchanger 31 by switching at the switching valve 98. After that, the refrigerant from the second interior heat exchanger 31 circulates through the exterior heat exchanger 20, the inner heat exchanger 60, the ejector 40, the gas-liquid separator 50, the inner heat exchanger 60, and the compressor 10, in this order. The low-pressure refrigerant circulates through the gas-liquid separator 50, the interior heat exchanger 30, the ejector 40, and the gas-liquid separator 50, in this order.

Therefore, in the sixth embodiment, in the dehumidifying and heating operation, the high-pressure refrigerant is decompressed by the ejector 40 while gas refrigerant from the interior heat exchanger 30 is sucked into the ejector 40. Accordingly, in the dehumidifying and heating operation, air dehumidified and cooled in the interior heat exchanger 30 can be heated by both the heater core 80 and the second interior heat exchanger 31. Therefore, the advantage similar to the third embodiment can be obtained.

(Seventh Embodiment)

Figure 12:
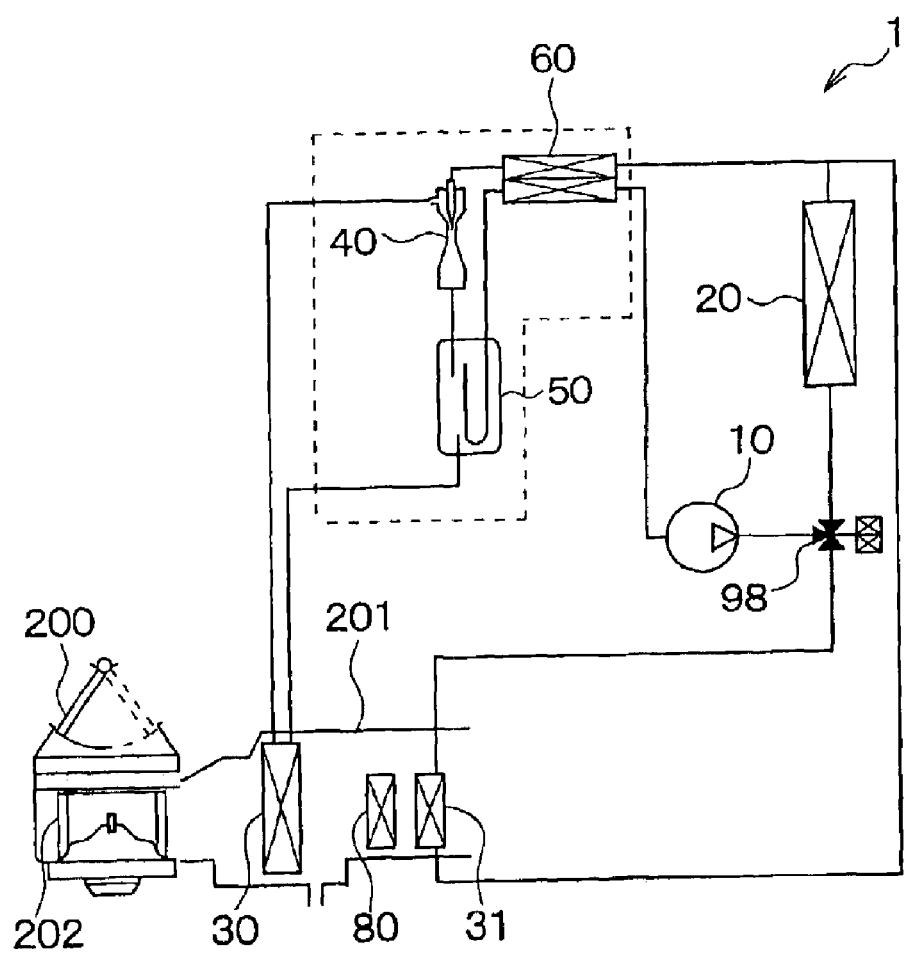
FIG. 12 is a schematic diagram showing an air conditioner with a refrigerant cycle according to a seventh embodiment of the present invention.

This embodiment is a modification of the above-mentioned sixth embodiment. Specifically, a part of refrigerant discharged from the compressor 10 is branched at the switching valve 98, and flows into the second interior heat exchanger 31, as shown in FIG. 12. After that, the part of the refrigerant and the other part of the refrigerant branched at the switching valve 98 join at the outlet side of the exterior heat exchanger 20.

Although a system of the seventh embodiment is modified, operation of the system of the seventh embodiment is similar to that of the above-described sixth embodiment (i.e., similar to that of the third embodiment), and the advantage similar to the third embodiment can be obtained.

(Other Embodiments)

Although the vapor-compression refrigerant cycle is a refrigerant cycle with the ejector type decompression device in the above embodiments, the present invention is not limited to use this refrigerant cycle. A capillary tube, a fixed throttle, or a temperature-actuation type expansion valve can be used as a decompression device in the vapor-compression refrigerant cycle.

In the above embodiments, carbon dioxide is used as the refrigerant, so that the refrigerant pressure of high-pressure side is equal to or higher than the critical pressure of the refrigerant. However, the present invention is not limited to use this refrigerant. For example, a fluorocarbon can be used as the refrigerant, so that the refrigerant pressure of high-pressure side is equal to or lower than the critical pressure of the refrigerant.

In the above embodiments, although water is used in the water-refrigerant heat exchanger 70, other fluid can be used instead of water so that fluid-refrigerant heat exchanger is used instead of the water-refrigerant heat exchanger 70. Further, other fluid can flows through the heater core 80 for heating air.

Although the air conditioner has no air mixing door, which controls an air flow volume (i.e., a cooling air flow volume) bypassing the heater core 80 and the second interior heat exchanger 31, the present invention is not limited to this usage without air mixing door. The air-mixing door can be disposed. In this case, for example, in the cooling operation, the air-mixing door controls the temperature of the air to be blown into the compartment.

Although the variable displacement compressor is used in the above embodiments, the present invention is not limited to use this variable displacement compressor. An electric rotation variable type compressor can be used, so that the compressor absorbs a variation of an air conditioning load by controlling a rotational speed variably.

Although the variable displacement compressor is used in the above embodiments, the present invention is not limited to use this variable displacement compressor. A fixed capacity type compressor can be used.

Such changes and modifications are to be understood as being within the scope of the present invention as defined by the appended claims.

What is claimed is:

1. An air conditioner for a compartment, comprising:
    a compressor for compressing and discharging refrigerant;
    an exterior heat exchanger for performing heat exchange between refrigerant and outside air outside the compartment;
    an interior heat exchanger for performing heat exchange between refrigerant and air to be blown into the compartment;
    an ejector for decompressing refrigerant discharged from the compressor while sucking gas refrigerant from one of the interior heat exchanger and exterior heat exchanger, and for converting expansion energy to pressure energy to increase pressure of refrigerant to be sucked to the compressor;

a heater core disposed for heating air to be blown into the compartment by using a fluid flowing therein as a heating source;

a fluid-refrigerant heat exchanger disposed to perform heat exchange between refrigerant discharged from the compressor and the fluid to be supplied to the heater core;

first and second throttles for decompressing refrigerant in substantially iso-enthalpy; and a switching unit for changing a refrigerant flow to switch one of a first operation where the compartment is cooled, a second operation where the compartment is dehumidified while being heated, and a third operation where the compartment is heated, wherein;

when refrigerant is evaporated in the interior heat exchanger to cool air passing through the interior heat exchanger, refrigerant is decompressed in the ejector;

in the first operation, refrigerant after being decompressed is evaporated in the interior heat exchanger to cool air passing therethrough, and high-pressure refrigerant discharged from the compressor is decompressed in the ejector while sucking gas refrigerant from the interior heat exchanger;

in the second operation, refrigerant after being decompressed is evaporated in the interior heat exchanger to cool and dehumidify air passing therethrough, and high-pressure refrigerant discharged from the compressor is decompressed by the first throttle; and in the third operation, high-temperature refrigerant before being decompressed flows into the interior heat exchanger to heat air passing therethrough, and the high-pressure refrigerant is decompressed in the second throttle.

2. An air conditioner according to claim 1, further comprising a gas-liquid separator for separating refrigerant into gas refrigerant and liquid refrigerant.

3. An air conditioner according to claim 1, further comprising:

a gas-liquid separator for separating refrigerant into gas refrigerant and liquid refrigerant, wherein:

in the first operation, refrigerant discharged from the compressor flows through the exterior heat exchanger, the ejector, the gas-liquid separator and the compressor in this order, while liquid refrigerant in the gas-liquid separator circulates the interior heat exchanger, the ejector and the gas-liquid separator in this order;

in the second operation, refrigerant discharged from the compressor circulates the fluid-refrigerant heat exchanger, the first throttle, the interior heat exchanger, the second throttle, the exterior heat exchanger, the ejector, the gas-liquid separator and the compressor in this order, while refrigerant only passes through the second throttle and ejector without decompression; and in the third operation, refrigerant discharged from the compressor circulates the fluid-refrigerant heat exchanger, the first throttle, the interior heat exchanger, the second throttle, the exterior heat exchanger, the ejector, the gas-liquid separator and the compressor in this order, while refrigerant only passes through the first throttle and the ejector without decompression.

4. An air conditioner according to claim 1, further comprising an air conditioning case for defining an air passage through which air flows into the compartment, the air conditioning case being disposed to accommodate the interior heat exchanger, wherein:

the heater core is disposed in the air conditioning case downstream from the interior heat exchanger in an air flow direction; and the fluid-refrigerant heat exchanger is disposed outside the air conditioning case.

5. An air conditioner according to claim 1, wherein refrigerant discharged from the compressor has a pressure equal to or higher than the critical pressure of the refrigerant.

6. An air conditioner according to claim 5, wherein the refrigerant is carbon dioxide.

7. An air conditioner according to claim 1, wherein refrigerant discharged from the compressor has a pressure lower than the critical pressure of the refrigerant.

8. An air conditioner according to claim 7, wherein the refrigerant is fluorocarbon.

* * * * *